United States Patent [19]
Sukenori et al.

[11] Patent Number: 5,943,106
[45] Date of Patent: Aug. 24, 1999

[54] LIQUID CRYSTAL DISPLAY WITH BRANCHED OF AUXILIARY CAPACITOR PATTERN AND ITS MANUFACTURE METHOD

[75] Inventors: Hidetoshi Sukenori; Kouji Tsukao; Kenichi Nagaoka, all of Kawasaki, Japan

[73] Assignee: Fujitsu Limited, Kawasaki, Japan

[21] Appl. No.: 08/902,304

[22] Filed: Jul. 29, 1997

[30] Foreign Application Priority Data

Feb. 20, 1997 [JP] Japan ................................ 9-036597

[51] Int. Cl.[6] .................................................. G02F 1/1343
[52] U.S. Cl. ............................... 349/39; 349/38; 349/192
[58] Field of Search ............................ 349/38, 39, 192; 345/93

[56] References Cited

U.S. PATENT DOCUMENTS

| | | | |
|---|---|---|---|
| 5,054,887 | 10/1991 | Kato et al. | 349/39 |
| 5,598,285 | 1/1997 | Kondo et al. | 349/39 |
| 5,648,826 | 7/1997 | Song et al. | 349/39 |
| 5,745,195 | 4/1998 | Zhang | 349/39 |
| 5,771,083 | 6/1998 | Fujihara et al. | 349/39 |
| 5,796,448 | 8/1998 | Kim | 349/39 |
| 5,844,641 | 12/1998 | Jun et al. | 349/39 |
| 5,847,780 | 12/1998 | Kim et al. | 349/39 |

*Primary Examiner*—William L. Sikes
*Assistant Examiner*—Kari M. Horney
*Attorney, Agent, or Firm*—Greer, Burns & Crain, Ltd.

[57] ABSTRACT

A plurality of control and data bus lines are formed on the surface of an insulating substrate. A pixel electrode and a switching element are formed at an area corresponding to each interconnection portion between the control and data bus lines. A plurality of capacitor bus lines are formed on the surface of the interlayer insulating substrate for forming an auxiliary capacitor between the pixel electrode and capacitor bus line. The capacitor bus line has an auxiliary capacitor pattern branching from the capacitor bus line and extending along the data bus line. This auxiliary capacitor pattern is constituted of a cutting portion and a remaining main portion. A space between the cutting portion and a corresponding data bus line is broader than that between the main portion and the corresponding data bus line.

17 Claims, 8 Drawing Sheets

LIQUID CRYSTAL DISPLAY WITH BRANCHED OF AUXILIARY CAPACITOR PATTERN AND ITS MANUFACTURE METHOD

This application is based on Japanese Patent Application 9-36597 filed on Feb. 20, 1997, the entire contents of which are incorporated herein by reference.

BACKGROUND OF THE INVENTION

1. Field of the Invention

The present invention relates to a liquid crystal display device and its manufacture method, and more particularly to a liquid crystal display device of an active matrix type with auxiliary capacitors which seemingly increases each pixel capacitance and to its manufacture method.

2. Description of the Related Art

A conventional thin film transistor (TFT) type liquid crystal display device will be described with reference to FIGS. 6A and 6B.

FIG. 6A is a plan view showing the layout of a TFT substrate. Formed on the surface of a transparent substrate are a plurality of control bus lines 100 extending in a horizontal direction in FIG. 6A and a plurality of data bus lines 101 extending in a vertical direction. Each bus line 100 is electrically insulated by an insulating film from each data bus line 101 at their cross points. Between adjacent two control bus lines 100, a capacitor bus line 102 is disposed extending in generally parallel with the control bus lines 100. Similarly, each capacitor bus line 102 is electrically insulated from each data bus line 101 at their cross points. The capacitor bus line 102 is applied with a constant potential, for example, a ground potential.

A TFT 103 is formed near at each cross point between the control bus 100 and data bus line 101. The drain electrode of TFT 103 is connected to the corresponding data bus line 101, and the corresponding bus line 100 serves also as the gate electrode of TFT 103. The source electrode of TFT 103 is connected to the corresponding pixel electrode 104. This pixel electrode 104 is disposed in an area surrounded by the corresponding control and data bus lines 100 and 101.

An auxiliary capacitor pattern 105 branched from the capacitor bus line 102 is disposed in parallel with and adjacent to the data bus line 101 in each area where the pixel electrode 104 is disposed. The auxiliary capacitor pattern 105 is overlapped with the corresponding pixel electrode 104. An auxiliary capacitor $C_S$ is formed between the pixel electrode 104 and the capacitor bus line 102 and auxiliary capacitor pattern 105.

A common electrode substrate is disposed facing the TFT substrate, and liquid crystal material is accommodated in a space between these two substrates.

FIG. 6B is an equivalent circuit diagram of one pixel of the liquid crystal display device shown in FIG. 6A. A liquid crystal capacitor $C_{LC}$ is formed between the pixel electrode 104 and common electrode, and the auxiliary capacitor $C_S$ is connected in parallel with the liquid crystal capacitor. A stray capacitor $C_{DS}$ is formed between the pixel electrode 104 and data bus line 101.

If a potential at the data bus line 101 varies while TFT 103 is non-conductive, i.e., while this pixel is not selected, the potential at the pixel electrode 104 also varies because of capacitive coupling by the stray capacitor $C_{DS}$. This potential change $\Delta V$ is given by:

$$\Delta V = CV_{DS}/(CV_{DS}+C_{LC}+C_S) \qquad (1)$$

This voltage fluctuation causes crosstalk (luminance variation) which depends on a slope of luminance along the display screen scan direction (parallel with the data bus line 101) and on a display pattern.

This voltage fluctuation $\Delta V$ is suppressed by the auxiliary capacitor $C_S$ in parallel with the liquid crystal capacitor $C_{LC}$ of the device shown in FIG. 6A. If a large auxiliary capacitor $C_S$ is formed by using the capacitor bus line 102 and auxiliary capacitor pattern 105, the effects of voltage fluctuation on the data bus line 101 can be eliminated and the display quality can be improved.

As shown in FIG. 6A, the auxiliary capacitor pattern 105 is disposed adjacent to the data bus line 101 so as to provide as large an aperture ratio as possible. Because of this proximate layout, insufficient strength of an insulating film between the auxiliary capacitor pattern 105 and dada bus line 101 may occur or electrical short circuit therebetween may occur due to position alignment errors of these patterns.

A short circuit recovery method will be described with reference to FIG. 7 which is a schematic plan view of a TFT substrate.

In a display area 110, TFT's 103 and pixel electrodes 104 are disposed in a matrix pattern. A plurality of repair wiring patterns 111 are formed at upper, lower and right peripheral regions of this display area 110. For example, ten repair wiring patterns 111 are prepared. Each repair wiring pattern 111 intersects with data bus lines 101 at the upper and lower peripheral regions of the display area 110.

If there is a short circuit between the auxiliary capacitor pattern 105 and data bus line 101, the data bus line 101 is cut at points $D_1$ and $D_2$ on both sides of the short circuit point. Cutting the data bus line is performed, for example, through radiation of laser beam.

The data bus lines 101 cut at the points $D_1$ and $D_2$ are connected to one of the repair wiring patterns 111 at their cross points. This connection is performed, for example, by radiation of laser beam to the connection points. The data bus lines 101 cut in the display area 110 are therefore electrically connected again by the repair wiring pattern 111. These repair works require a number of processes, and their success possibility is small. Furthermore, since the repair wiring patterns 111 are required to be formed in the peripheral region (called a frame region) of the display area 110, it is difficult to reduce the area of the frame region. If an electrical short circuit is formed in a plurality of pixels connected to one data bus line, repairs are impossible. Similarly, if an electrical short circuit is formed on data bus lines more than the number of repair wiring patterns 111, repairs are impossible.

SUMMARY OF THE INVENTION

It is an object of the present invention to provide a liquid crystal display device and its manufacture method capable of readily recovering short circuits between a data bus line and an auxiliary capacitor pattern.

According to one aspect of the present invention, there is provided a liquid crystal display panel comprising: a plurality of control bus lines disposed in parallel on the surface of an insulating substrate; a plurality of data bus lines disposed in parallel on the surface of the insulating substrate, the data bus lines extending in a direction of intersecting with the control bus lines and electrically insulated from the control bus lines at intersection areas between the control bus lines and the data bus lines; a pixel electrode disposed on the surface of the insulating substrate, corresponding to each interconnection between said control bus line and said data bus line, said pixel electrode being disposed substantially in an area surrounded by adjacent two control bus lines and adjacent two data bus lines; a switching element disposed on the surface of the insulating substrate at an area corresponding to each interconnection between the control bus line and the data bus line, for connecting the corresponding data bus line to the pixel electrode under the control of a conduction state of the switching element by the corresponding control bus line; a plurality of capacitor bus lines disposed on the surface of the insulating substrate for forming an auxiliary capacitor between each capacitor bus line and the pixel electrode; and an auxiliary capacitor pattern branched from the capacitor bus line and extending along the data bus line, the auxiliary capacitor pattern including a cutting portion and a remaining main portion, and a space between the cutting portion and a corresponding data bus line is broader than a space between the main portion and the corresponding data bus line.

According to another aspect of the present invention, there is provided a method of manufacturing a liquid crystal display panel comprising the steps of: preparing a liquid crystal display panel component comprising: a plurality of control bus lines disposed in parallel on the surface of an insulating substrate; a plurality of data bus lines disposed in parallel on the surface of the insulating substrate, the data bus lines extending in a direction of intersecting with the control bus lines and electrically insulated from the control bus lines at intersection areas between the control bus lines and the data bus lines; a pixel electrode disposed on the surface of the insulating substrate, corresponding to each interconnection between said control bus line and said data bus line, said pixel electrode being disposed substantially in an area surrounded by adjacent two control bus lines and adjacent two data bus lines; a switching element disposed on the surface of the insulating substrate at an area corresponding to each interconnection between the control bus line and the data bus line, for connecting the corresponding data bus line to the pixel electrode under the control of a conduction state of the switching element by the corresponding control bus line; a plurality of capacitor bus lines disposed on the surface of the insulating substrate for forming an auxiliary capacitor between each capacitor bus line and the pixel electrode; and an auxiliary capacitor pattern branched from the capacitor bus line and disposed along the data bus line in correspondence to each pixel electrode; inspecting an electrical short circuit between each auxiliary capacitor pattern and a corresponding data bus line; and if an electrical short circuit is found at the inspecting step, cutting the auxiliary capacitor pattern short-circuited to the data bus line at an intermediate area between the short-circuit portion and a branching portion of the auxiliary capacitor pattern from the capacitor bus line, by radiating laser beam.

As above, insufficient dielectric strength, between a data bus line and its nearby auxiliary capacitor pattern for forming an auxiliary capacitor so as to seemingly increase a liquid crystal capacitance of each pixel of a liquid crystal device, can be easily recovered by cutting the auxiliary capacitor pattern at its corresponding cutting portion.

DETAILED DESCRIPTION OF THE PREFERRED EMBODIMENTS

Figure 1:
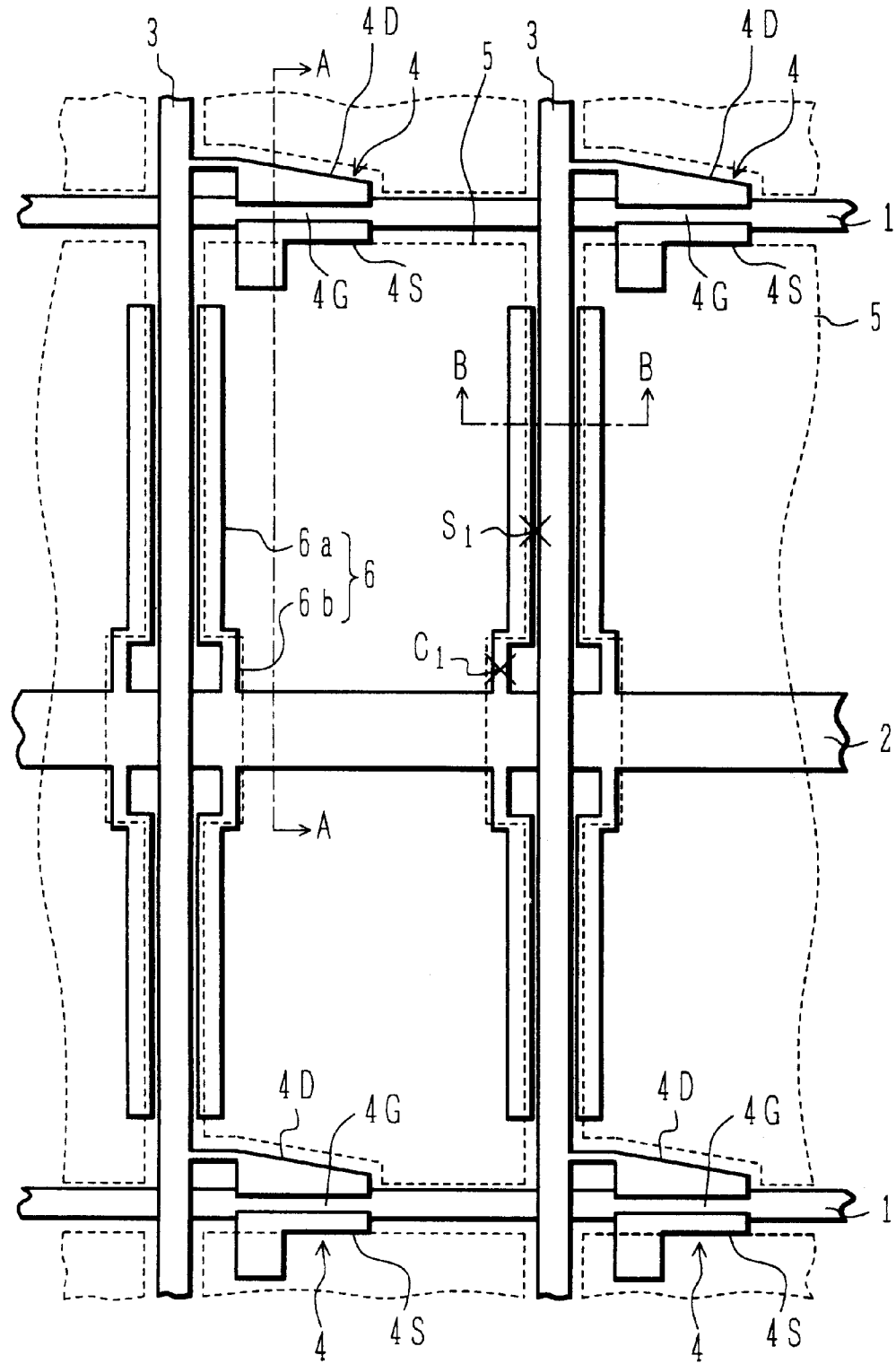
FIG. 1 is a plan view of a TFT substrate of a liquid crystal display device according to a first embodiment of the invention.

FIG. 1 is a plan view of a thin film transistor (TFT) substrate of an active matrix type liquid crystal display device according to the first embodiment of the invention. A plurality of control bus lines 1 are disposed in parallel along the horizontal direction as viewed in FIG. 1, and between adjacent two control bus lines 1 a capacitor bus line 2 is disposed in parallel with the control bus 1. The control bus lines 1 and capacitor bus lines 2 are covered with an insulating film. A plurality of data bus lines 3 are disposed on this insulating film in a direction (vertical direction as viewed in FIG. 1) intersecting with the control bus lines 1. The data bus lines 3 are electrically insulated from the control bus lines 1 and capacitor bus lines 2 at their cross points by the insulating film.

TFT's 4 are formed near at the cross points between the data bus lines 3 and control bus lines 1. The drain region 4D of TFT 4 is connected to the corresponding data bus line 3. The corresponding control bus line 1 serves also as the gate electrode 4G of TFT 4.

The data bus lines 3 and TFT's 4 are covered with an interlayer insulating film on which a plurality of pixel electrodes 5 are formed. Each pixel electrode 5 is disposed in an area surrounded by adjacent two data bus lines 3 and adjacent two control bus lines 1. In order to make it easy to understand the structure of the substrate, each pixel electrode 5 is shown by a broken line in FIG. 1. The pixel electrode 5 is connected to the source region 4S of the corresponding TFT 4 via a contact hole formed in the interlayer insulating film.

An auxiliary capacitor pattern 6 branched from the capacitor bus line 2 is disposed near the data bus line 3 for each pixel electrode. The auxiliary capacitor pattern 6 is constituted of a cutting portion 6b formed near at the area branching from the capacitor bus line 2 and a remaining main portion 6a. A space between the cutting portion 6b and corresponding data bus line 3 is broader than that between the main portion 6a and corresponding data bus line 3.

For example, the space between adjacent two data bus lines 3 is 80 $\mu$m, the space between the cutting portion 6b of the auxiliary capacitor pattern 6 and the data bus line 3 is 7 $\mu$m, and the space between the main portion 6a and the data bus line 3 is 1 $\mu$m. As compared to the width 6 $\mu$m of the main portion 6a, the width of the cutting portion 6b is 4 $\mu$m. The width of the cutting portion 6b of the auxiliary capacitor pattern 6 is therefore set narrower than that of the main portion 6a.

The space between two adjacent control bus lines 1 is 256 µm, the width of the capacitor bus line 2 is 20 µm, the length of the cutting portion 6b is 12 µm, and the length of the main portion 6a is 79 µm.

Figure 2A:
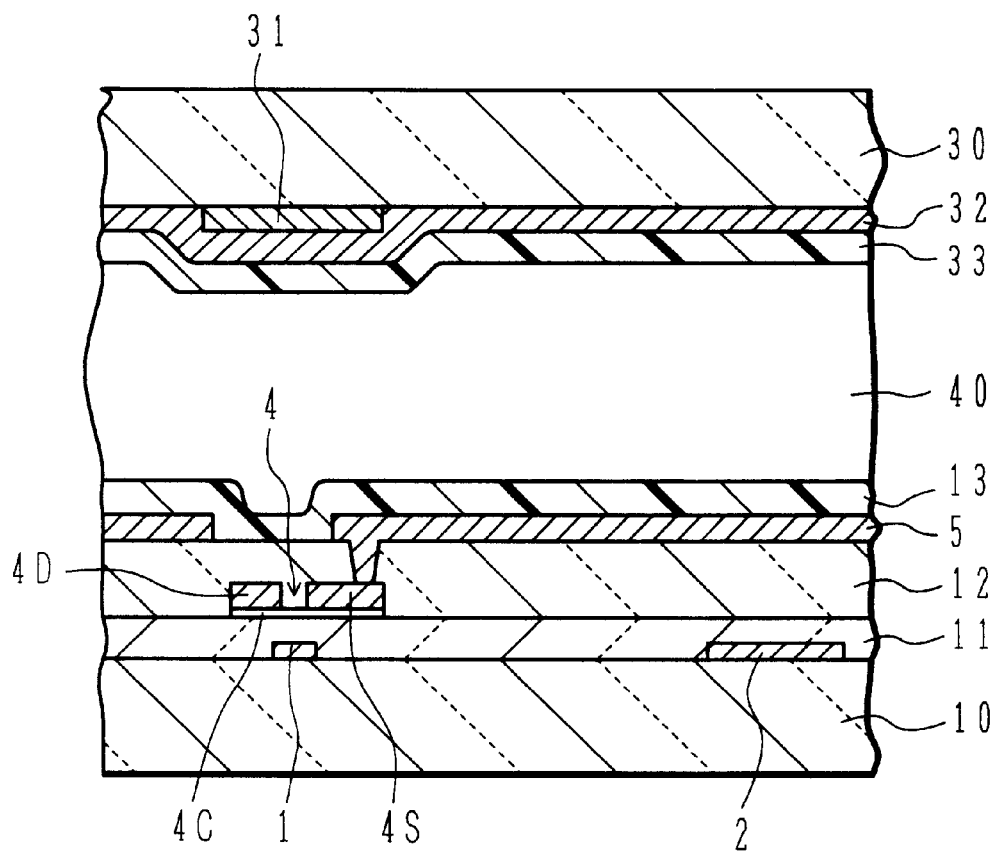
FIGS. 2A and 2B are partial cross sectional views of a liquid crystal display device using the TFT substrate shown in FIG. 1.

FIG. 2A is a cross sectional view of the liquid crystal display device using the TFT substrate shown in FIG. 1, this view being taken along one-dot chain line A—A. Glass substrates 10 and 30 are disposed parallel, facing each other at a predetermined space therebetween. On the confronting surface of the glass substrate 10, the control bus line 1 and capacitor bus line 2 made of chrome (Cr) are formed. The control bus line 1 and capacitor bus line 2 may be formed by depositing a Cr film through sputtering on the whole confronting surface of the glass substrate 10 and by patterning it. In this case, the auxiliary capacitor pattern 6 shown in FIG. 1 is formed at the same time.

A gate insulating film 11 of about 400 nm thick SiN is formed covering the control bus line 1 and capacitor bus line 2. The gate insulating film 11 may be formed by plasma-enhanced chemical vapor deposition (PE-CVD). An amorphous silicon film 4C about 150 nm thick is formed on the surface of the gate insulating film 11 at the region where TFT 4 is formed.

A source electrode 4S and a drain electrode 4D respectively having a three-layer structure of Ti/Al/Ti are formed on the surface of the amorphous silicon film 4C at areas corresponding to source and drain regions. The thickness of the lower Ti layer is about 20 nm, that of the Al layer is about 50 nm, and that of the upper Ti layer is about 80 nm. In this case, the source and drain electrodes 4S and 4D are formed at the same time when the data bus line shown in FIG. 1 is formed.

Deposition of the amorphous silicon film 4C may be performed by PE-CVD using $SiH_4$ as source gas, and patterning thereof may be performed through etching via a resist pattern mask by using a plasma asher. Deposition of the Ti and Al layers may be performed through sputtering, and patterning thereof may be performed through wet etching via a resist pattern mask.

An interlayer insulating film 12 of about 330 µm thick SiN covering TFT 4 is formed on the surface of the gate insulating film 11. The interlayer insulating film 12 may be formed through PE-CVD.

A plurality of pixel electrodes 5 made of indium tin oxide (ITO) are formed on the surface of the interlayer insulating film 12. The pixel electrode 5 may be formed by depositing an ITO film through sputtering and by patterning it. Each transparent pixel electrode 5 is connected to the source electrode 4S of TFT 4 via a contact hole formed in the interlayer insulating film 12. An orientation film 13 is formed on the whole surface of the substrate, covering the transparent pixel electrodes 5.

On the confronting surface of the glass substrate 30, a light shielding film 31 of about 120 nm thick Cr is formed at an area corresponding to TFT 4. The light shielding film 31 may be formed by depositing a Cr film on the whole surface of the substrate by sputtering and patterning it by wet etching.

A transparent common electrode 32 of ITO is formed on the whole surface of the substrate, covering the light shielding film 31, and an orientation film 33 is formed on the surface of the transparent common electrode 32. Liquid crystal material 40 is accommodated in a space between the orientation films 13 and 33.

Figure 6A:
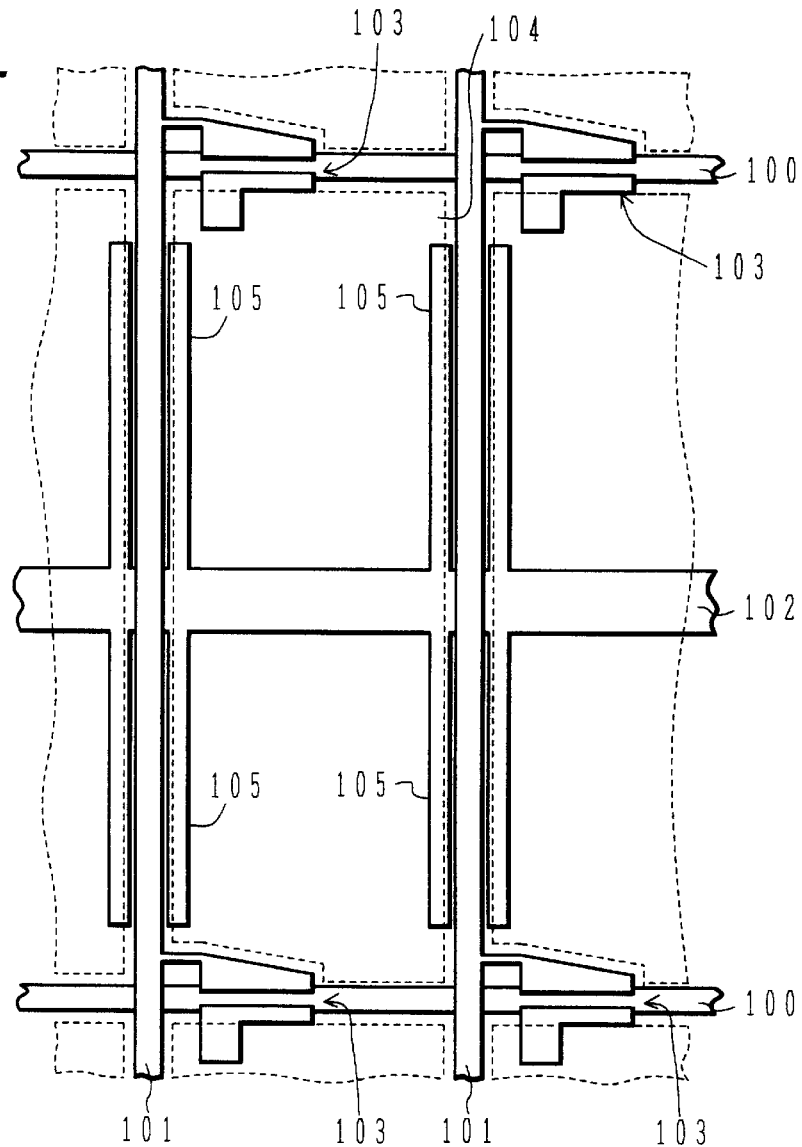
FIG. 6A is a partial plan view of a TFT substrate of a conventional liquid crystal display device.
Figure 6B:
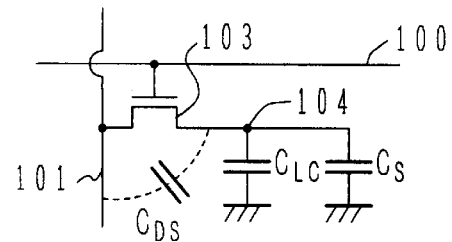
FIG. 6B is an equivalent circuit diagram of one pixel of the TFT substrate.

As shown in FIG. 1, although the main portion 6a of the auxiliary capacitor pattern 6 overlaps the pixel electrode 5, the cutting portion 6b does not overlap it. The capacitor bus line 2 and auxiliary capacitor pattern 6 and an overlap portion of the pixel electrode 5 constitute the auxiliary capacitor $C_S$ shown in FIG. 6B.

Figure 2B:
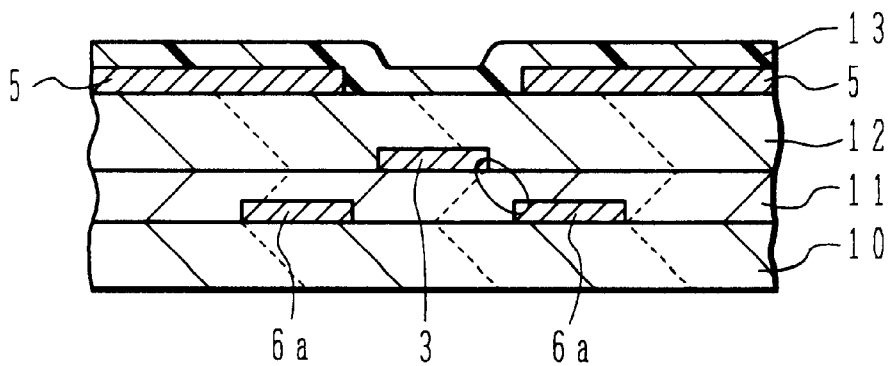

FIG. 2B is a cross sectional view of the substrate taken along one-dot chain line B—B shown in FIG. 1. The auxiliary capacitor patterns 6a are formed on the surface of the transparent substrate 10 and covered with the gate insulating film 11. The data bus line 3 is covered with the interlayer insulating film 12 on which the pixel electrode 5 and orientation film 13 are disposed.

The data bus line 3 and auxiliary capacitor pattern 6a are disposed near each other in the substrate, and only the gate insulating film 11 is interposed between these line and pattern in the direction normal to the substrate surface. Therefore, a short circuit between these line and pattern is likely to be formed via the interlayer region indicated by an ellipse in FIG. 2B.

If the auxiliary capacitor pattern 6 and data bus line 3 are short-circuited, the cutting portion of the corresponding auxiliary capacitor pattern 6 is cut by radiating laser beam. For example, if a short circuit is formed at a point $S_1$ shown in FIG. 1, the cutting portion of the corresponding capacitor pattern 6 is cut at a point $C_1$. Laser beam to be radiated may be YAG laser beam having a wavelength of 1064 nm, a power of 0.53 MW and a beam spot size of 2 to 10 µm φ.

Since the space between the cutting portion 6b of the auxiliary capacitor pattern 6 and the data bus line 3 is relatively broad, only the auxiliary capacitor pattern 6 can be cut without cutting the data bus line 3. Further, since the pixel electrode 5 and cutting portion 6b do not overlap, it is possible to prevent a short circuit between the auxiliary capacitor pattern 6 and pixel electrode 5 at the cut point. Accordingly, even if dielectric strength is insufficient between the auxiliary capacitor pattern 6 and data bus line 3, this defective region can be readily recovered by cutting the auxiliary capacitor pattern 6.

Furthermore, in this embodiment, it is not necessary to form repair wiring patterns so that the frame area of the substrate can be reduced. Still further, even if a plurality of short circuits are formed on a single data bus line, these short circuits can be recovered.

Figure 3:
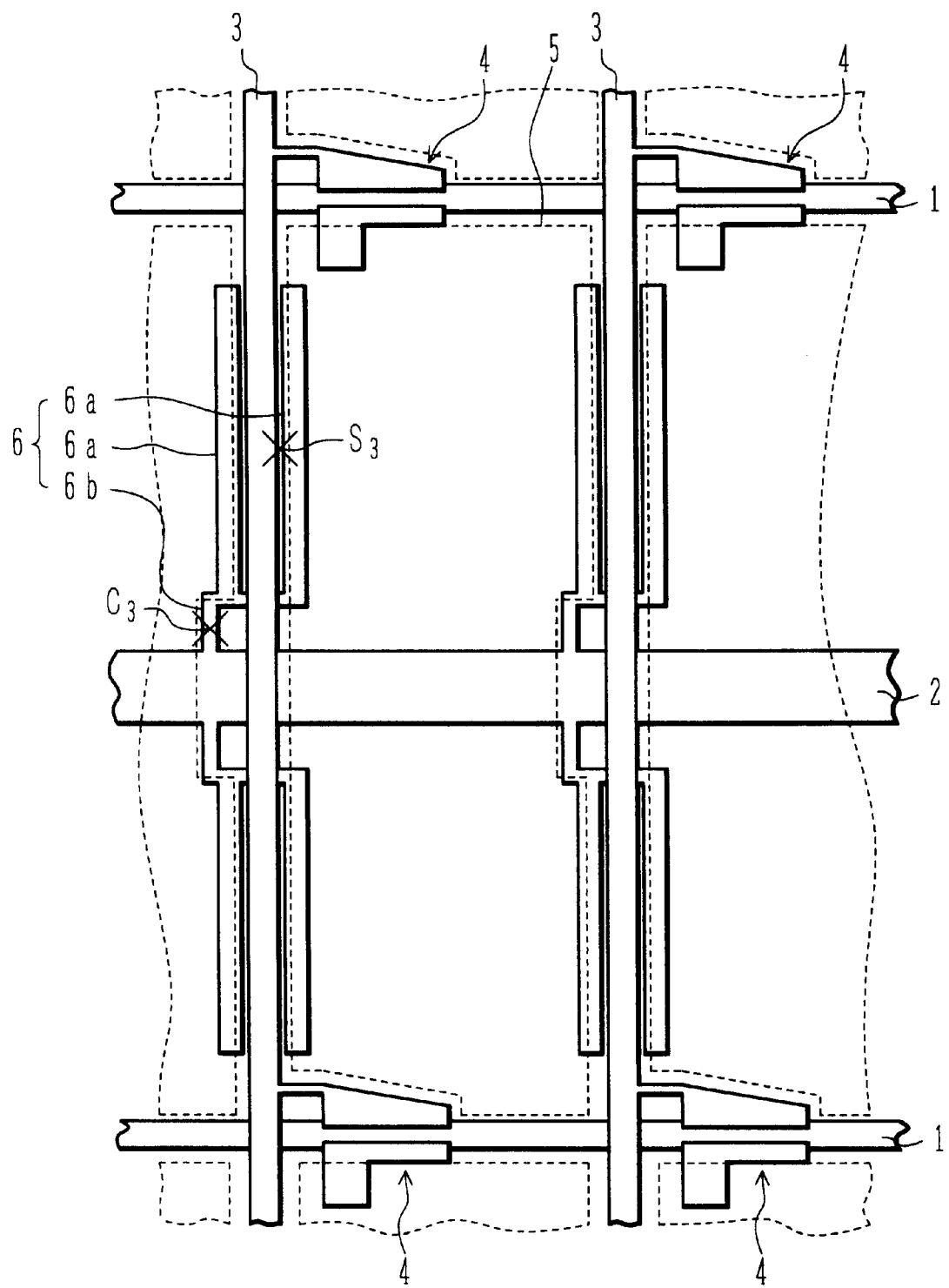
FIG. 3 is a plan view of a TFT substrate of a liquid crystal display device according to a second embodiment of the invention.

FIG. 3 is a plan view of a TFT substrate of a liquid crystal display device according to the second embodiment of the invention. Only the shape of the auxiliary capacitor pattern is different from the TFT substrate shown in FIG. 1, and the other structures are the same as those of the TFT substrate shown in FIG. 1.

The auxiliary capacitor pattern 6 has bifurcated portions 6a after it branches from the capacitor bus line 2. These bifurcated portions 6a are disposed near both sides of the data bus line 3. A portion of the auxiliary capacitor pattern 6 at a branching area from the capacitor bus line 2 corresponds to the cutting portion 6b, and the portions at areas remote from the branching area correspond to the bifurcated main portions 6a. The auxiliary capacitors are formed by the bifurcated main portions 6a and overlapping two adjacent pixel electrodes 5.

For example, if a short circuit failure occurs at a point $S_3$ shown in FIG. 3, the cutting portion 6b of the corresponding auxiliary capacitor pattern 6 is cut at a point $C_3$.

Since a single cutting portion 6b is shared by the two main portions 6a, the number of areas to which laser beam is radiated can be reduced. It is therefore possible to improve an aperture ratio.

Figure 4A:
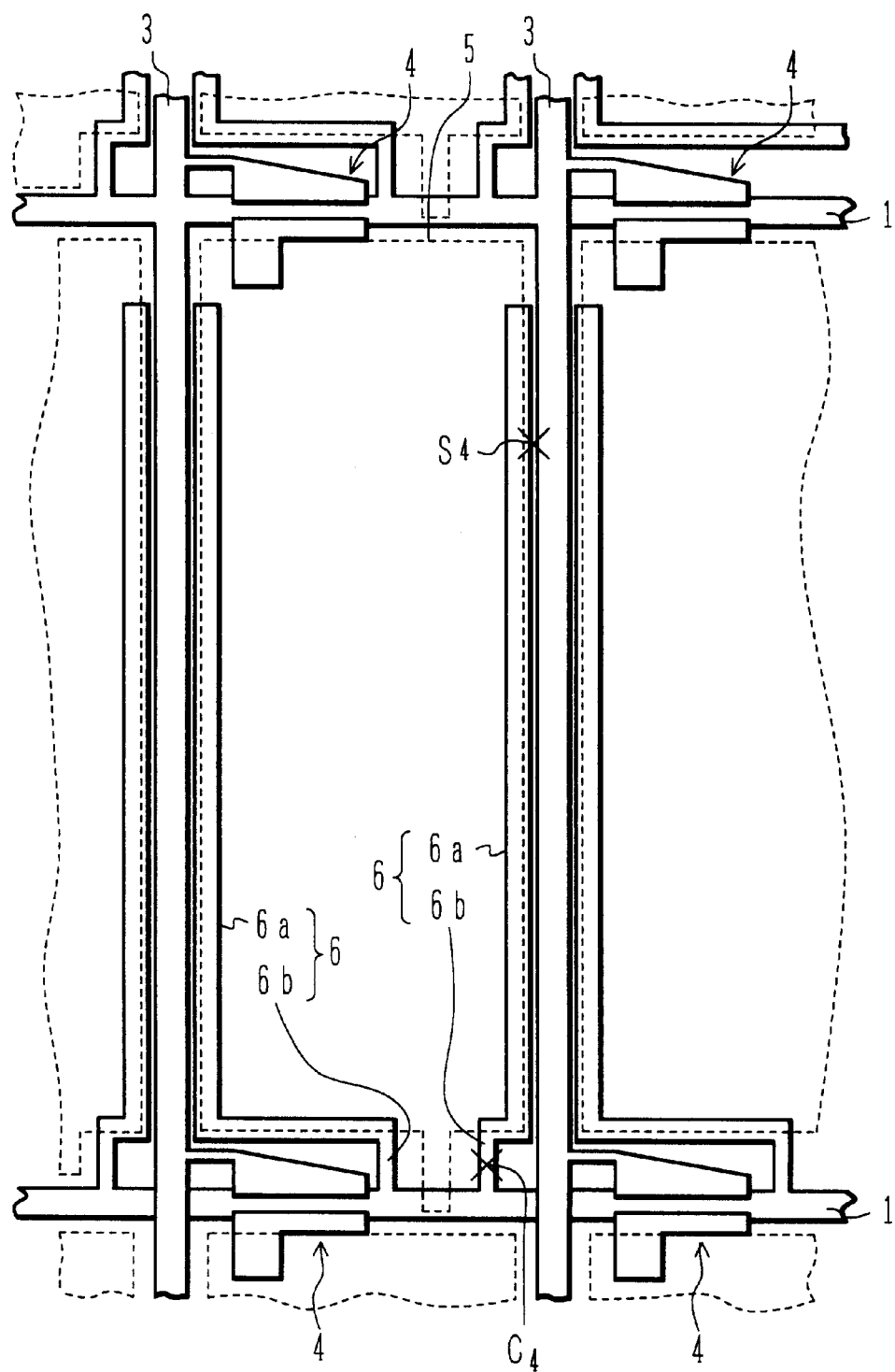
FIG. 4A is a plan view of a TFT substrate of a liquid crystal display device according to a third embodiment of the invention.

FIG. 4A is a plan view of a TFT substrate of a liquid crystal display device according to the third embodiment of the invention. The TFT substrate of the third embodiment is not provided with the capacitor bus line 2 shown in FIG. 1. The auxiliary capacitor pattern 6 disposed near the data bus line 3 branches from one of the two adjacent control bus lines 1 which bus line does not control the subject pixel electrode 5.

Each auxiliary capacitor pattern 6 is constituted of a cutting portion 6b and a remaining main portion 6a. The space between the main portion 6a and data bus line 3 is made narrower than that between the cutting portion 6b and data bus line 3.

In the TFT substrate shown in FIG. 4A, the auxiliary capacitor $C_S$ is formed by an overlapping pixel electrode 5 and one of two adjacent control bus lines 1 not controlling the subject pixel electrode. Since the non-selected control bus line 1 is supplied with a constant potential, this control bus line 1 performs the same function as the capacitor bus line 2 shown in FIG. 1 during the non-select period. Although the selected bus line 1 is instantaneously applied with a pulse voltage, this voltage application period is very short so that the display characteristics are not substantially degraded.

Also in the TFT substrate shown in FIG. 4A, if a short circuit occurs between the data bus line 3 and auxiliary capacitor pattern 6, the short circuit can be readily recovered by cutting the auxiliary capacitor pattern 6 through laser beam radiation to the cutting portion 6b thereof. For example, if a short circuit failure occurs at a point $S_4$ shown in FIG. 4A, the cutting portion 6b of the corresponding auxiliary capacitor pattern 6 is cut at a point $C_4$.

In the first to third embodiments, the auxiliary capacitor pattern 6 is made to have two portions, the cutting portion 6b and main portion 6a, and the space between the data bus line 3 and cutting portion 6b is made broader than that between the data bus line and main portion 6a. With this configuration, the auxiliary capacitor pattern 6 can be cut easily by laser beam radiation without adversely affecting the data bus line 3.

The shape of the auxiliary capacitor pattern 6 is not limited to those of the first to third embodiments so long as the auxiliary capacitor pattern 6 has at least one cutting portion capable of being cut by laser beam radiation. This cutting portion is formed spaced apart from the data bus line 3 more than the other portion of the auxiliary capacitor pattern 6. With this configuration of the auxiliary capacitor pattern 6, this pattern can be easily cut by laser beam radiation and insufficient dielectric strength can be recovered. In order to facilitate laser beam radiation, it is preferable to form the cutting portion to which laser beam is applied, at an area spaced apart from other conductive patterns such as wiring patterns by 5 μm or more. Since a pattern having a large area such as a pixel electrode pattern is less affected by laser beam radiation, it is preferable to form such a large area pattern at an area spaced apart from the cutting portion by at least 2 μm.

Figure 4B:
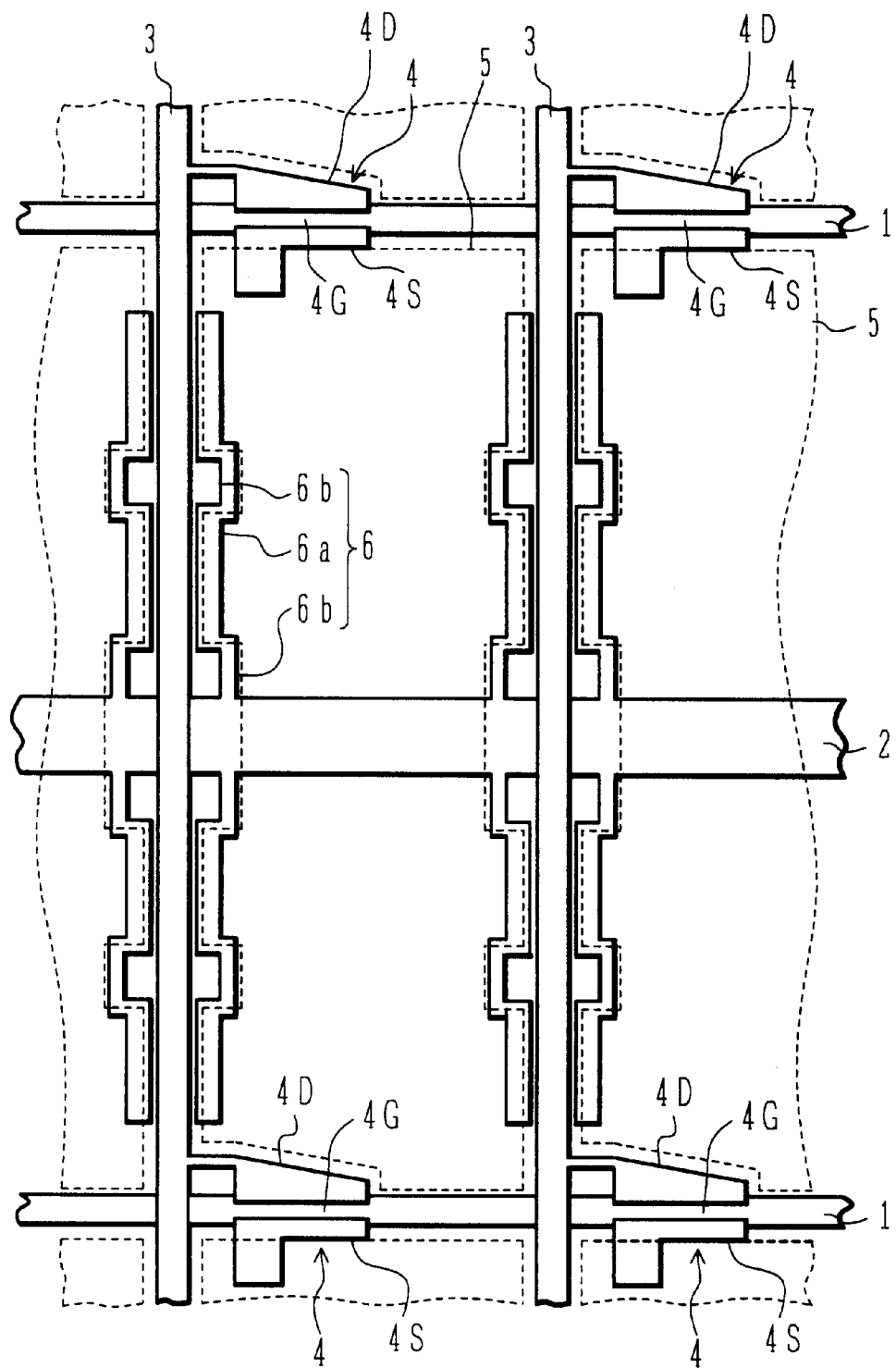
FIG. 4B is a plan view of a TFT substrate of a liquid crystal display device according to a modification of the first embodiment.

A plurality of cutting portions may be formed on a single auxiliary capacitor pattern 6 branched from the capacitor bus line 2. FIG. 4B is a plan view of a TFT substrate in which two cutting portions 6b are formed on a single auxiliary capacitor pattern 6. One cutting portion 6b is disposed at an area branching from the capacitor bus line 2 and the other cutting portion 6b is formed generally at the middle area of the auxiliary capacitor pattern 6. With this arrangement, the auxiliary capacitor pattern 6 is cut at the cutting portion formed nearer to a short circuit point on the branching area side. It is therefore possible to suppress a reduction of the auxiliary capacitor $C_S$ between the overlapping pixel electrode 5 and auxiliary capacitor pattern 6.

It is also preferable to make the width of the cutting portion narrower than that of the main portion. With this configuration, while the main portion can form a sufficient amount of capacitance, the cutting portion is made easy to be cut by laser beam radiation.

In the first to third embodiments, the cutting portion or portions 6b shown in FIGS. 1, 3, and FIGS. 4A and 4B may be provided for all pixels or for some pixels. If a display area likely to form short circuit failure can be localized beforehand, the cutting portion 6b may be formed only for those pixels in such a display area and the conventional arrangement shown in FIG. 6A may be provided for other pixels.

Figure 5A:
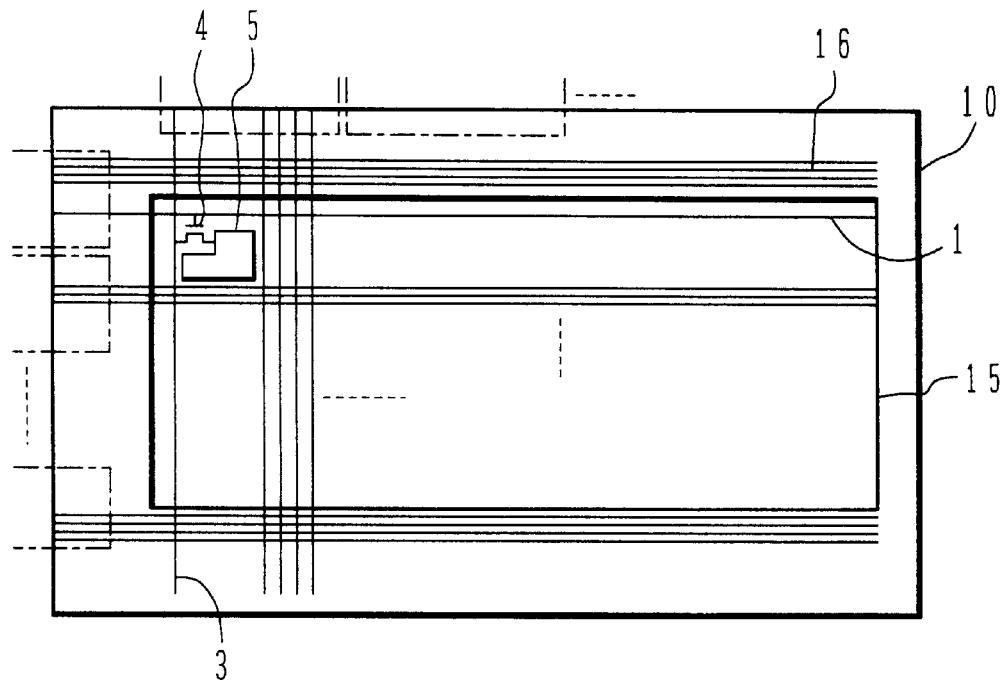
FIGS. 5A and 5B are schematic plan views of a TFT substrate and a liquid crystal display panel according the embodiments of the invention.

FIG. 5A is a schematic diagram showing the whole area of a TFT substrate of the liquid crystal display device of the first to third embodiments. A display area 15 is defined within the surface area of a TFT substrate 10, and in this display area 15 pairs of TFT 4 and pixel electrode 5 are disposed in a matrix shape.

Control bus lines 1 and repair wiring patterns 16 extending in the horizontal direction in FIG. 5A are formed in the display area 15 and in the regions upper and lower than the display area 15. The control bus lines 1 and repair wiring patterns 16 extend to the left end of the transparent substrate 10 and are connected to an external driver circuit by tape automated bonding (TAB). Data bus lines 3 extending in the vertical direction in FIG. 5A are formed in the display area 15. Each data bus line 3 extends to the upper end of the transparent substrate 10 and is connected to an external driver circuit by TAB. The structure of the device in the display area 15 is the same as the first to third embodiments.

Figure 7:
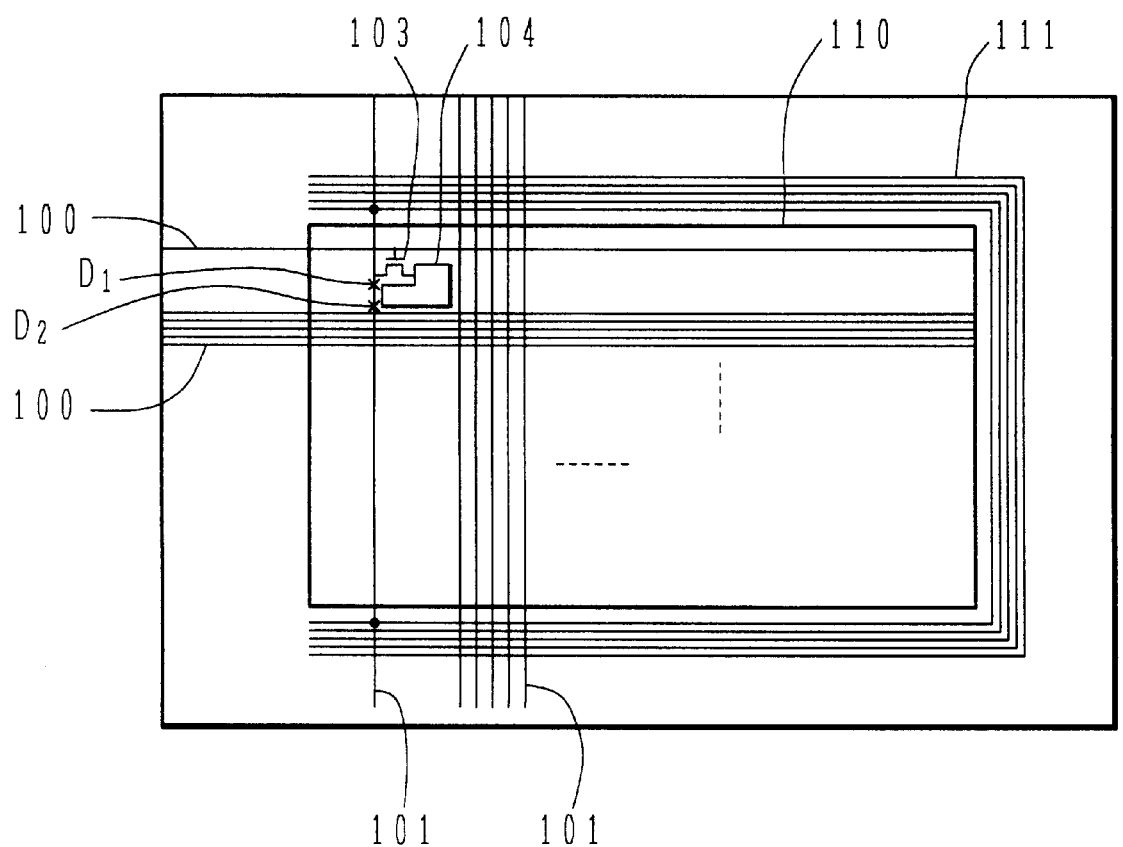
FIG. 7 is a schematic plan view showing the outline of a TFT substrate of a conventional liquid crystal display device.

The repair wiring pattern 16 is used for the replacement of a burnout area of the data bus line 3. The number of repair wiring patterns 16 can be reduced as compared to the device shown in FIG. 7, because short circuit failures at between the data bus lines 3 and auxiliary capacitor patterns can be recovered without using repair wiring patterns 16.

Figure 5B:
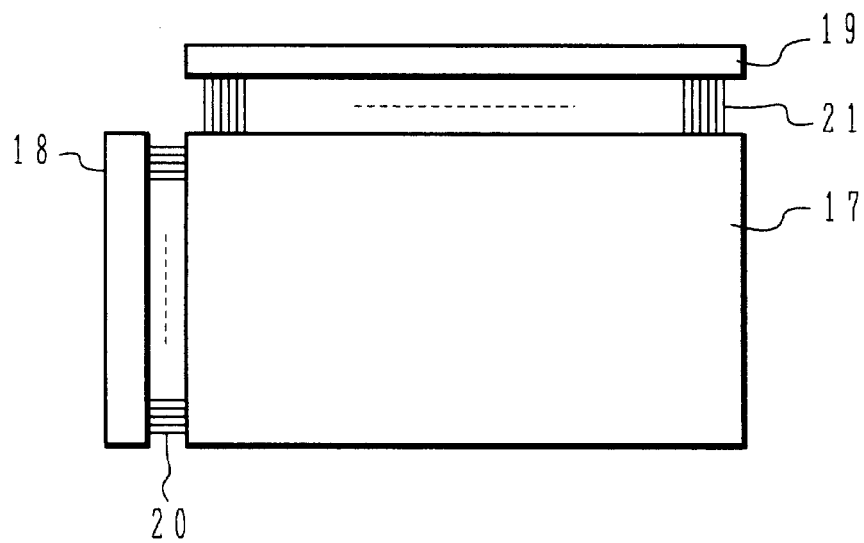

FIG. 5B is a schematic diagram showing a liquid crystal display apparatus using the display device of the first to third embodiments. This liquid crystal display apparatus is constituted of a liquid crystal display panel 17 including the TFT substrate shown in FIG. 5A and its opposing common electrode substrate, a control bus line driver circuit 18 and a data bus line driver circuit 19. The control bus line driver circuit 18 and data bus line driver circuit 19 are connected via interconnections 20 and 21 to control bus lines and data bus lines. The control bus line driver circuit 18 outputs a drive signal for scanning the control bus lines, whereas the data bus line driver circuit 19 outputs a drive signal for displaying an image in the display area. The control bus line driver circuit 18 and data bus line driver circuit 19 may be formed in the peripheral area of the TFT substrate at the same time when pixel switching TFT's are formed.

The present invention has been described in connection with the preferred embodiments. The invention is not limited only to the above embodiments. It is apparent that various modifications, improvements, combinations, and the like can be made by those skilled in the art.

We claim:

1. A liquid crystal display panel comprising:
   a plurality of control bus lines disposed in parallel on the surface of an insulating substrate;
   a plurality of data bus lines disposed in parallel on the surface of the insulating substrate, said data bus lines extending in a direction of intersecting with said control bus lines and electrically insulated from said control bus lines at intersection areas between said control bus lines and said data bus lines;

a pixel electrode disposed on the surface of the insulating substrate, corresponding to each interconnection between said control bus line and said data bus line, said pixel electrode being disposed substantially in an area surrounded by adjacent two control bus lines and adjacent two data bus lines;

a switching element disposed on the surface of the insulating substrate at an area corresponding to each interconnection between said control bus line and said data bus line, for connecting the corresponding data bus line to said pixel electrode under the control of a conduction state of said switching element by the corresponding control bus line;

a plurality of capacitor bus lines disposed on the surface of the insulating substrate for forming an auxiliary capacitor between each capacitor bus line and said pixel electrode; and an auxiliary capacitor pattern branched from said capacitor bus line and extending along said data bus line, said auxiliary capacitor pattern including a cutting portion and a remaining main portion, and a space between the cutting portion and a corresponding data bus line is broader than a space between the main portion and the corresponding data bus line.

2. A liquid crystal display panel according to claim 1, wherein a width of the cutting portion is narrower than a width of the main portion.

3. A liquid crystal display panel according to claim 1, wherein the cutting portion is disposed near at a branching point of said auxiliary capacitor pattern from said capacitor bus line.

4. A liquid crystal display panel according to claim 1, wherein the main portion of said auxiliary capacitor pattern overlaps said pixel electrode, and the cutting portion does not overlap said pixel electrode.

5. A liquid crystal display panel according to claim 1, wherein said auxiliary capacitor pattern has bifurcated portions at an area remote from a branching portion of said auxiliary capacitor pattern from said capacitor bus line, said bifurcated portions are disposed near said data bus line on both sides thereof, and a portion between the bifurcated portions and the branching portion corresponds to the cutting portion.

6. A liquid crystal display panel according to claim 1, wherein each control bus line serves also as said capacitor bus line, and said auxiliary capacitor pattern branched from said control bus line forms the auxiliary capacitor between said auxiliary capacitor pattern and said pixel electrode not controlled by said control bus line.

7. A liquid crystal display panel according to claim 1, wherein the cutting portion can be cut by laser beam radiation.

8. A method of manufacturing a liquid crystal display panel comprising the steps of:

preparing a liquid crystal display panel component comprising: a plurality of control bus lines disposed in parallel on the surface of an insulating substrate; a plurality of data bus lines disposed in parallel on the surface of the insulating substrate, said data bus lines extending in a direction of intersecting with said control bus lines and electrically insulated from said control bus lines at intersection areas between said control bus lines and said data bus lines; a pixel electrode disposed on the surface of the insulating substrate, corresponding to each interconnection between said control bus line and said data bus line, said pixel electrode being disposed substantially in an area surrounded by adjacent two control bus lines and adjacent two data bus lines; a switching element disposed on the surface of the insulating substrate at an area corresponding to each interconnection between said control bus line and said data bus line, for connecting the corresponding data bus line to said pixel electrode under the control of a conduction state of said switching element by the corresponding control bus line; a plurality of capacitor bus lines disposed on the surface of the insulating substrate for forming an auxiliary capacitor between each capacitor bus line and said pixel electrode; and an auxiliary capacitor pattern branched from said capacitor bus line and disposed along said data bus line in correspondence to each pixel electrode;

inspecting an electrical short circuit between each auxiliary capacitor pattern and a corresponding data bus line; and if an electrical short circuit is found at said inspecting step, cutting said auxiliary capacitor pattern short-circuited to said data bus line at an intermediate area between the short-circuit portion and a branching portion of said auxiliary capacitor pattern from said capacitor bus line.

9. A manufacture method according to claim 8, wherein said auxiliary capacitor pattern includes a cutting portion and a remaining main portion, a space between the cutting portion and a corresponding data bus line is broader than a space between the main portion and the corresponding data bus line, and said cutting step cuts the cutting portion.

10. A manufacture method according to claim 8, wherein said cutting step cuts said auxiliary capacitor pattern by laser beam radiation.

11. A liquid crystal display apparatus comprising:

a plurality of control bus lines disposed in parallel on the surface of an insulating substrate;

a plurality of data bus lines disposed in parallel on the surface of the insulating substrate, said data bus lines extending in a direction of intersecting with said control bus lines and electrically insulated from said control bus lines at intersection areas between said control bus lines and said data bus lines;

a pixel electrode disposed on the surface of the insulating substrate, corresponding to each interconnection between said control bus line and said data bus line, said pixel electrode being disposed substantially in an area surrounded by adjacent two control bus lines and adjacent two data bus lines;

a switching element disposed on the surface of the insulating substrate at an area corresponding to each interconnection between said control bus line and said data bus line, for connecting the corresponding data bus line to said pixel electrode under the control of a conduction state of said switching element by the corresponding control bus line;

a plurality of capacitor bus lines disposed on the surface of the insulating substrate for forming an auxiliary capacitor between each capacitor bus line and said pixel electrode;

an auxiliary capacitor pattern branched from said capacitor bus line and extending along said data bus line, said auxiliary capacitor pattern including a cutting portion and a remaining main portion, and a space between the cutting portion and a corresponding data bus line is broader than a space between the main portion and the corresponding data bus line;

a data bus line driver circuit for driving said data bus lines; and a control bus line driver circuit for driving said control bus line.

12. A liquid crystal display apparatus according to claim 11, wherein a width of the cutting portion is narrower than a width of the main portion.

13. A liquid crystal display apparatus according to claim 11, wherein the cutting portion is disposed near at a branching point of said auxiliary capacitor pattern from said capacitor bus line.

14. A liquid crystal display apparatus according to claim 11, wherein the main portion of said auxiliary capacitor pattern overlaps said pixel electrode, and the cutting portion does not overlap said pixel electrode.

15. A liquid crystal display apparatus according to claim 11, wherein said auxiliary capacitor pattern has bifurcated portions at an area remote from a branching portion of said auxiliary capacitor pattern from said capacitor bus line, said bifurcated portions are disposed near said data bus line on both sides thereof, and a portion between the bifurcated portions and the branching portion corresponds to the cutting portion.

16. A liquid crystal display apparatus according to claim 11, wherein each control bus line serves also as said capacitor bus line, and said auxiliary capacitor pattern branched from said control bus line forms the auxiliary capacitor between said auxiliary capacitor pattern and said pixel electrode not controlled by said control bus line.

17. A liquid crystal display apparatus according to claim 11, wherein the cutting portion can be cut by laser beam radiation.

* * * * *

UNITED STATES PATENT AND TRADEMARK OFFICE
CERTIFICATE OF CORRECTION

PATENT NO. : 5,943,106
DATED : August 24, 1999
INVENTOR(S) : Sukenori et al.

It is certified that error appears in the above-identified patent and that said Letters Patent is hereby corrected as shown below:

On the Face of the Patent:

Under "[54] Title" insert --LIQUID CRYSTAL DISPLAY PANEL EASY TO RECOVER DIELECTRIC BREAKDOWN OF AUXILIARY CAPACITOR PATTERN AND ITS MANUFACTURE METHOD--.

Under "[57] Abstract" line 10 and 11, delete "is constituted of" and insert --has-- therefor Column 9, line 1, delete "of intersecting" and insert --to intersect-- therefor

UNITED STATES PATENT AND TRADEMARK OFFICE
CERTIFICATE OF CORRECTION

PATENT NO. : 5,943,106
DATED : August 24, 1999
INVENTOR(S) : Sukenori et al.

It is certified that error appears in the above-identified patent and that said Letters Patent is hereby corrected as shown below:

Column 9, line 65, delete "of intersecting" and insert --to intersect-- therefor Column 10, line 45, delete "of intersecting" and insert --to intersect-- therefor Column 1, line 1, delete "with" and insert --Panel Easy To Recover Dielectric Breakdown-- therefor Column 1, line 2, delete "branched"

Signed and Sealed this

Thirteenth Day of June, 2000

Attest:

Q. TODD DICKINSON

*Attesting Officer*        *Director of Patents and Trademarks*